UNITED STATES PATENT OFFICE.

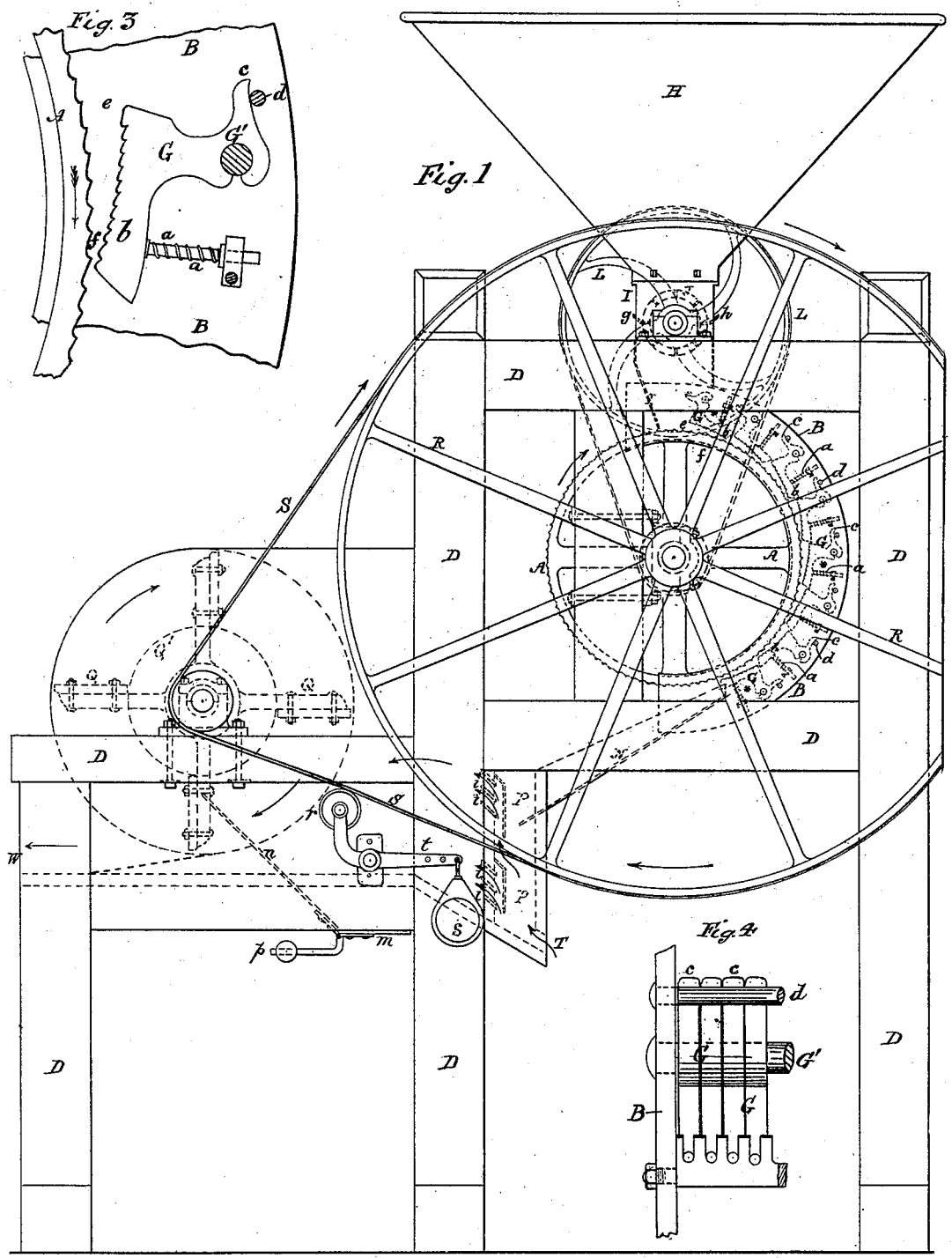

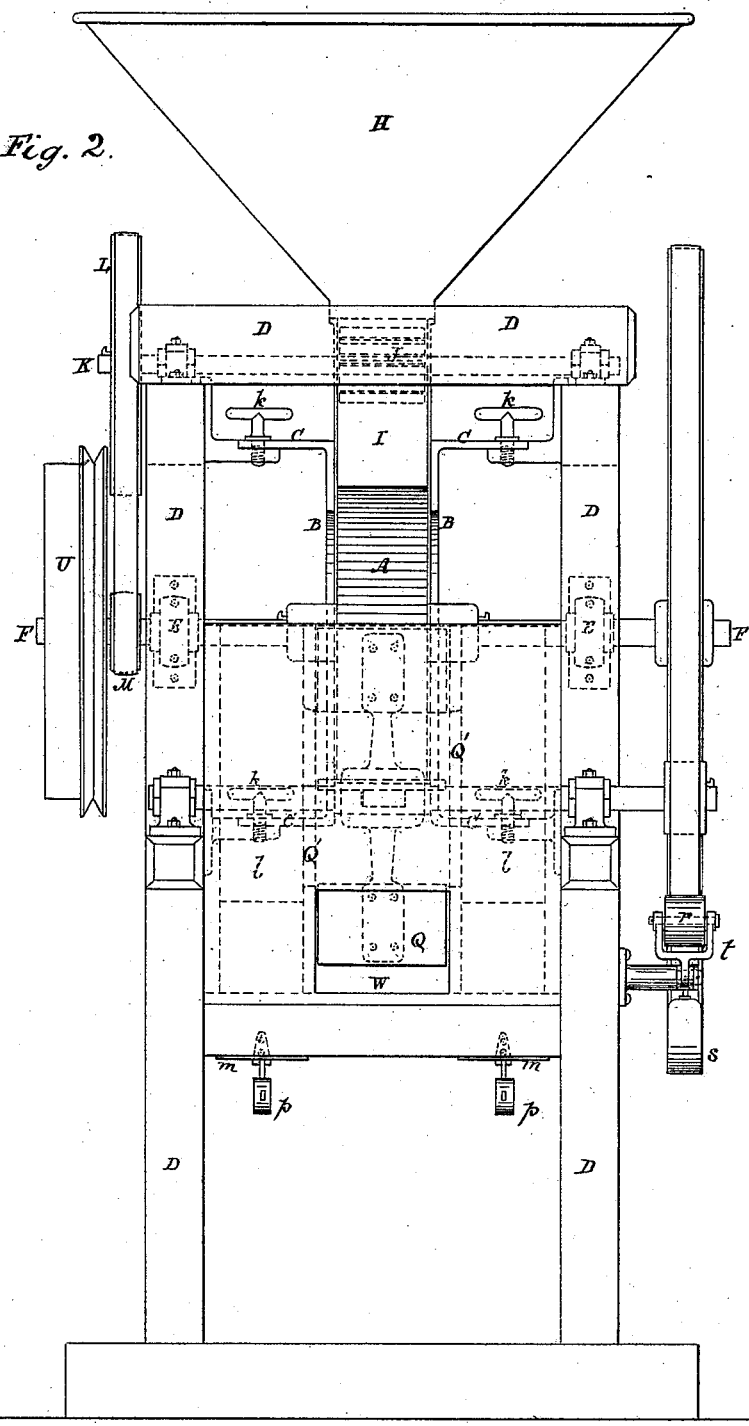

JOSE A. MOSQUERA, OF CARACAS, VENEZUELA.

IMPROVEMENT IN COFFEE-HULLING APPARATUS.

Specification forming part of Letters Patent No. 210,265, dated November 26, 1878; application filed April 27, 1878; patented in England, February 12, 1878.

*To all whom it may concern:*

Be it known that I, JOSE ANTONIO MOS-QUERA, of Caracas, Venezuela, at present residing at 45 Linden Gardens, Bayswater, in the county of Middlesex, England, have invented improvements in apparatus for shelling coffee and other similar products, and for separating the husk from the bean simultaneously, of which the following is a specification:

This invention relates to improvements in apparatus for shelling coffee and other similar products, and for separating the husk from the bean simultaneously; and consists in the employment of a main cylinder, having its surface roughened or corrugated with parallel longitudinal serrations, of which the broadest or advancing faces incline backwardly, in combination with a series of parallel ranges or tiers of spring tumblers or strippers arranged in an adjustable case in concave form, each of which tumblers is controlled in its movements in part by a spring, and has its rubbing-face transversely grooved with serrations arranged parallel with and similar in form to those on the main cylinder, but having their broadest or rubbing faces set in the opposite direction to those of the main cylinder, and of different pitch or degree of fineness, and so pivoted as to secure, when in action upon the berries, a peculiar compound rubbing motion, whereby the husk is easily and quickly disintegrated and removed without injury to the bean.

My improved machine is provided with a suitable apparatus for controlling the feed and other apparatus for winnowing or cleaning the coffee or other grains after they leave the decorticating apparatus.

Figures 1 and 2 of the drawings show, respectively, end and front elevations of my machine, and Fig. 3 an enlarged detail of one of the tumblers or strippers and a section of the surface of main cylinder, showing the difference in the degree of fineness or pitch of the serrations on both tumbler and cylinder, as well as the relative disposition of their rubbing-faces and the direction of movement of the main cylinder.

The drum is inclosed between two side plates, B B, which have prolongations or extension-pieces C C upon them, to enable the drum to be carried on the main frame D of the machine, on which the bearings E E, carrying the drum-spindle F, are mounted.

A series of spring tumblers or levers, G G, of peculiar form and size, are arranged side by side in any desired number on pins G' in circumferential order for about one-half of the circumference of the serrated drum A, as shown in Fig. 1, and are maintained in position relatively with the drum A by springs $a$ acting upon one arm, $b$, of each lever G, another arm or projection, $c$, of the said lever taking against a stop-pin, $d$. The internal face of the arm $b$ of each tumbler or lever G—that is to say, the face next the serrated periphery of the drum A—is also serrated, the pitch of the serrations being finer than those of the drum. Said serrations are similar in form and construction to the furrows of a millstone used for grinding grain—that is to say, the leading edge or deepest part of the serration is in advance on main drum A, while in the strippers or tumblers G G the respective positions of the leading and trailing edges of the serration or furrow are reversed as regards the corresponding features of drum A. This arrangement of the beveled faces of the serrations with reference to each other assists to impart to the bean embraced between them a peculiar forward rolling movement under pressure, which movement largely contributes to the abrasion and separation of the husk from the berry.

The toothed or serrated face of the tumbler G is so arranged with reference to the periphery of the drum A that there is more room afforded for the bean to enter at the point $e$ than where it leaves at the point $f$, from which the shelling action ensues. The area of the opening at the point where the bean enters each row of tumblers is in the same proportion as that of the feed-drum above. One of the tumblers or levers G, with a portion of one of its side plates, B, is shown on a larger scale in Fig. 3; and several of them in end view in Fig. 4.

It will be seen that pins G' G', upon which the tumblers G G are pivoted or hinged, are placed opposite, or nearly opposite, the middle of the serrated or corrugated faces of the tumblers G G, and that when the machine is at rest projections c c find abutment and rest against stop-pins d d. Hence the introduction of the bean or kernel between face of drum A and tumbler G at point e will induce no action or movement of tumbler G until it has been forced down below a point opposite the pivoted center of tumbler G—viz., pin G'. Its progress beyond or below this point carries it under the influence of spring a, which, gently yielding under the crowding influence exerted by drum A upon or against the beans, kernels, or grains in their passage opposite the lower part of arm b, imparts to the tumbler a tremulous oscillatory or vibratory movement upon or about its axis G', which slight movement is slightly reciprocatory in its character, thus exerting on the material acted on a peculiar rubbing force, the heel and point of rubbing-face of tumbler G, so to speak, advancing to and receding from face of drum A, and at the same time each corrugation or serration thereof moving in the arc of a circle, having pin G' for its center of movement. This system is essentially different in construction and operation from those employing sectional rubbing-faces controlled by springs, and working uniformly on slides or guide-pins in one direction, or when the rubbing-surface is formed on one end of the spring itself, the other end being rigidly fastened to the case.

In practice the coffee is fed into a hopper, H, fixed at the upper part of the machine. The chute I, conveying the bean to the acting portion of the drum A, is fitted with a smaller drum, J, the axle K of which carries a pulley, L, driven by a smaller pulley, M, and strap from the axle of the main drum, and the drum J (seen in Fig. 1) is formed with pockets, to regulate the feed in conjunction with two adjustable blades, g h, which are fitted one on either side of this smaller drum J, and which also prevent the entrance of stones or any other foreign substance into the machine without being detected. Below the drum A is an inclined plane, N, forming a delivery-chute, upon which the bean and husk fall together, and from which they are delivered into a receptacle, P. Through openings i i i i in the receptacle P a strong current of air is drawn or sucked up by a fan, Q, put in motion by the band S from the larger pulley R on the axle of the main drum, as seen in Fig. 1. The fan Q causes the husk and other débris to be drawn away from the beans, which latter, by their superior specific gravity, fall and escape through the opening T at the bottom of the receptacle P, where they can be collected, as desired, in a perfectly clean state.

The axle of the main drum A is fitted with a pulley, U, for driving through the intermediation of a band or gut by steam or other power; or the machine may be driven by hand, if desired, according to the size of the machine.

The extensions or prolongations C C of the side plates B B, which inclose the acting portion of the serrated drum A, offer great facility for the insertion and removal of the shelling portion of the machine, it being only necessary to remove the four screws k k k k to enable the frame carrying the tumblers to be withdrawn. Said screws k k k k also furnish facilities for vertically adjusting the shelling-case B B, so as to secure, when desired, a throat or line of passage between the exterior of drum A and the rubbing-faces of tumblers G G from the inlet to the outlet for the coffee-beans and the débris of husks, &c., in their transit gradually increasing or diminishing in capacity as the exigencies of the case may require.

The action of the apparatus is as follows: The beans are fed into the hopper H, from which they descend by their own weight onto the serrated periphery of the shelling-drum A, the feed being regulated by the smaller pocketed drum J above, as hereinbefore explained. From this point the rotation of the drum A causes the beans to enter between the serrated periphery to the serrated face of the tumblers or levers G, which surround a portion of its circumference, by which they receive a rubbing action, the husks being removed under the pressure of the springs a, acting on one extension of the tumblers or levers G, the beans and husks falling together down the inclined plane N into the receptacle P, where they are separated from each other by the action of the blast produced by the fan Q, the beans escaping by the opening T, while the husks and other débris are driven out at the opening W.

The fan is inclosed within two side casings, l l, as will be seen on reference to Fig. 2, these being in continuation with the receptacle P, and through which the shells and husks are drawn into it through the opening Q'. These side casings l l are provided with one or more self-acting flaps or doors, m m, at the base of a sloping plate, n, which arrests any beans which may be carried through the openings i i by the suction of the fan. These collect on the flaps m m until their weight overcomes that of the balance-weight p, when the flap opens, discharges the beans, and then returns to its normal position, as shown.

The strap driving the fan is kept taut by means of the roller r, being pressed against it by the weight s, the two being centered on opposite ends of the lever t, pivoted on the side of the frame, as clearly shown in Figs. 1 and 2.

I claim—

1. The tumblers G G, provided with actuating-springs and back stops, combined and arranged as described, and having their rubbing-faces transversely serrated, as shown, in combination with a principal rotating cylinder, having its peripheral surface longitudinally furrowed with serrations of the character described, as a means for abrading and removing the hulls of coffee and other analogous berries or grains, the whole being constructed and arranged to operate substantially in the manner described and set forth.

2. In machines for hulling coffee, the combination of the cylinder A with the tumblers G G, having their rubbing-faces transversely serrated, as described, and pivoted intermediately between stops $d$ and springs $a$, as described, whereby a double positive motion is imparted to the tumblers, the first or primary motion being in a line directly toward the peripheral surface of the cylinder, the last or secondary motion being in a line partially tangential to the same, substantially as set forth.

3. In machines for hulling coffee, a main rotating cylinder, having its surface furrowed with longitudinal serrations, in which the broader faces are the leading or rubbing faces, in combination with oscillatory tumblers pivoted and controlled in their movements, as herein described, having their rubbing-surfaces furrowed with transverse serrations, differing in pitch from those of the main cylinder, but having the broader faces of such serrations set in opposite direction to those of the main cylinder, when constructed and arranged to operate substantially in the manner described and set forth.

J. A. MOSQUERA.

Witnesses:
  A. DUVALL,
  E. EDMONDS,
     166 *Fleet street, London.*